United States Patent [19]

Noonan

[11] 4,099,512
[45] Jul. 11, 1978

[54] HEAT-CONSERVING COOKING UTENSIL
[76] Inventor: Joseph Noonan, 100 Santa Inez, San Clemente, Calif. 92672
[21] Appl. No.: 754,356
[22] Filed: Dec. 27, 1976
[51] Int. Cl.² .................... A47G 23/04; F24C 15/18
[52] U.S. Cl. .............................. 126/246; 126/215; 126/373
[58] Field of Search .............. 126/246, 373, 389, 390, 126/215

[56] References Cited

U.S. PATENT DOCUMENTS

| 501,574 | 7/1893 | Nye | 126/215 |
|---|---|---|---|
| 851,191 | 4/1907 | Wolfe | 126/215 |
| 1,399,866 | 12/1921 | Kirk et al. | 126/215 |
| 2,569,753 | 10/1951 | Fry | 126/215 |
| 2,583,887 | 1/1952 | Schneeweiss | 126/389 |
| 3,469,524 | 9/1969 | Trozzolo | 126/390 |
| 3,785,274 | 1/1974 | Yamamoto | 126/390 |
| 3,809,063 | 5/1974 | Hajnal | 126/373 |

*Primary Examiner*—Ronald C. Capossela
*Attorney, Agent, or Firm*—Lawrence Fleming

[57] ABSTRACT

A heat-conserving cooking utensil for use on top of an ordinary kitchen stove. A pot-shaped metal housing with an open bottom is placed over a stove burner. Supported inside is a cooking pan shaped generally like a frying pan, whose handle protrudes out through a vertical slot in the side of the housing. The pan can thus be inserted and removed without reaching into the housing. A cover retains the heat. The top of the cover is conically concave, so that water or grease condensing on the inside will run to the center and drip back down into the pan. The cover is provided with an adjustable vent opening to control the degree of moisture retained in the food. The cooking pans and cover may be used separately. The utensil will efficiently thaw and heat frozen snacks, and bake pastries including pies, cakes, waffles and pizza, as well as casseroles and omelets. It is suitable for roasting meat. Bacon may be fried crisp without turning it over.

6 Claims, 6 Drawing Figures

U.S. Patent     July 11, 1978     4,099,512
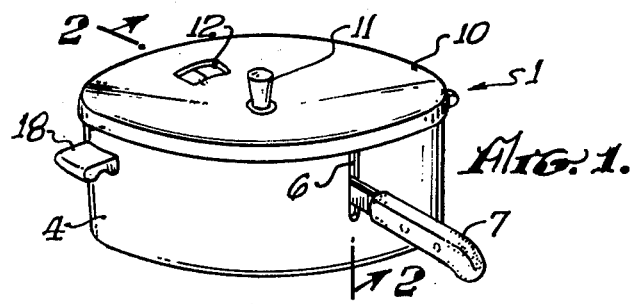
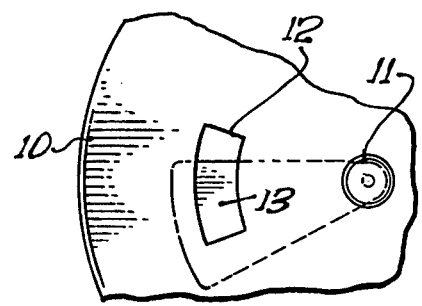
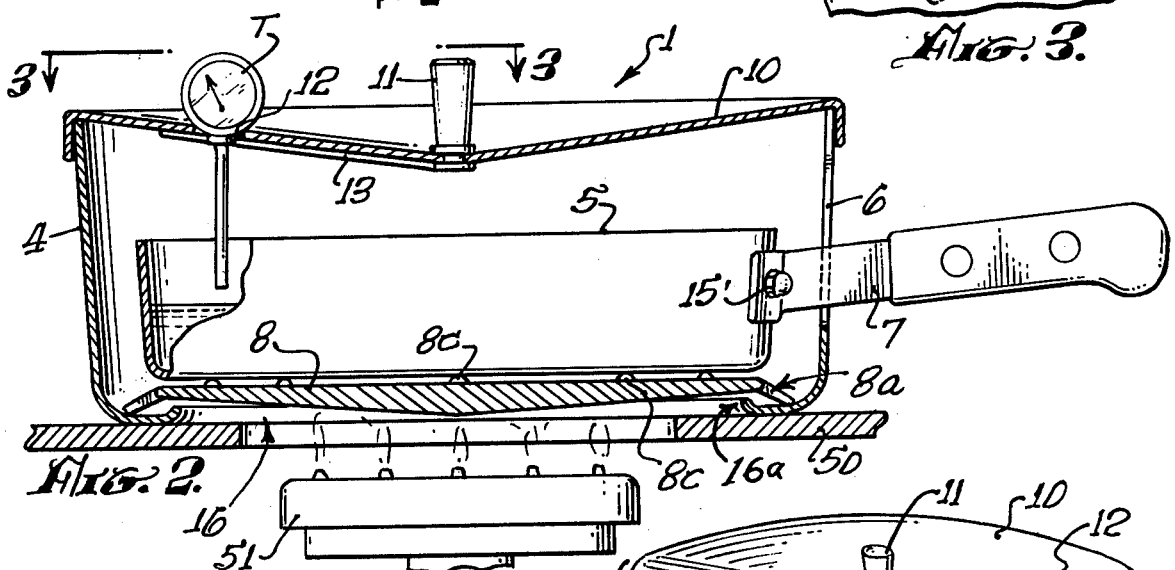
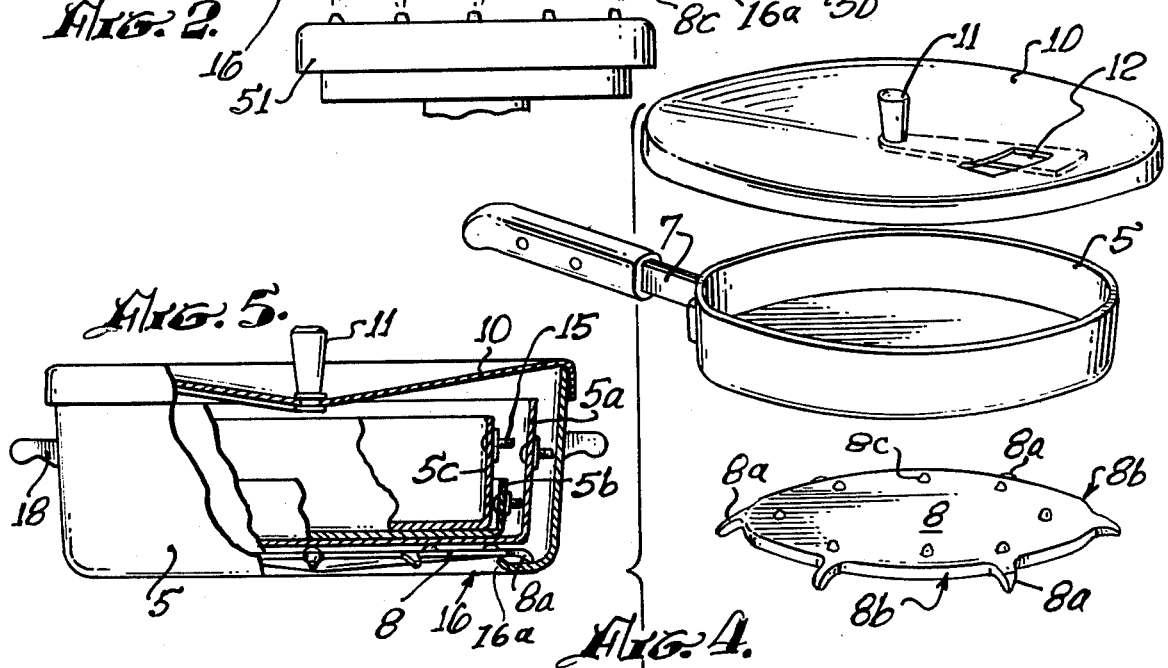
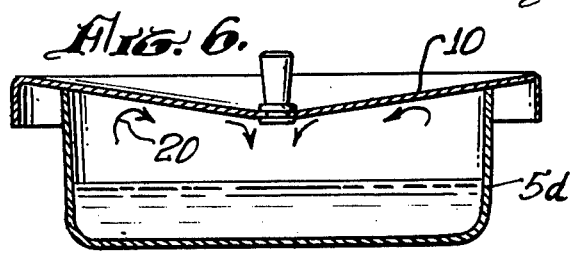
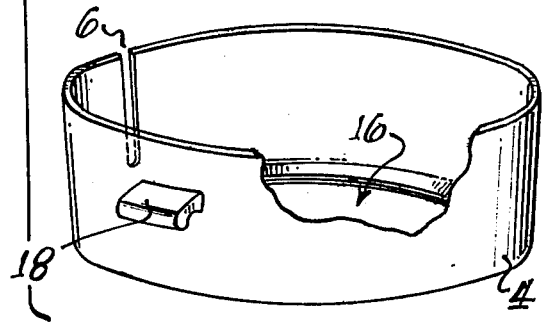

HEAT-CONSERVING COOKING UTENSIL

BACKGROUND OF THE INVENTION

Cooking utensils have been made in many forms with the objects of conserving heat energy, distributing the heat evenly, and controlling the loss of moisture, as well as lightweight, simplicity, cost, convenience, and ease of cleaning.

Since the first mass manufacture of cooking utensils by stamping and drawing of sheet metal began a century ago, the common western designs have been appropriate to environments where kitchen space and time were plentiful and heat energy cheap. Present trends imply a need for a new approach to the problem.

BRIEF SUMMARY

This invention provides a heat-conserving and moisture-conserving cooking utensil of simple construction to be placed, e.g., over one of the burners of an ordinary stove such as a gas stove, or over a gas plate. It comprises a cooking pan enclosed on the sides and top by a housing with a removable cover. The bottom of the housing is substantially open. A semi-open thick metal "spider" is supported in this bottom opening, and the cooking pan rests on it. The stove burner heats the bottom of the pan by conduction and radiation via the center portion of the spider, and the sides and top by convection.

The cover is provided with an adjustable vent opening, controlled by turning a central handle or knob. The top of the cover is dished-in, in the shape of a re-entrant shallow cone. Vapors from the food cooking in the pan may condense on the underside of the cover, then run back toward the center and drip back down into the pan.

The handle of the pan passes outward through a vertical slot in the side of the housing. Thus, the pan can readily and safely be inserted or removed from outside the housing with one hand, like a frying pan.

Several pans of different sizes may be provided for use in the same housing. The pans and the cover may be used separately.

IN THE DRAWING

FIG. 1 is a perspective view of a utensil according to the invention;

FIG. 2 is a side sectional view on line 2—2 of FIG. 1;

FIG. 3 is a plan view of a portion of the cover, looking in the direction of 3—3 of FIG. 2;

FIG. 4 is an exploded perspective view of the utensil showing the components;

FIG. 5 is a side sectional view of a utensil packed for shipping; and

FIG. 6 is a partial side sectional view showing heat circulation.

DETAILED DESCRIPTION

Referring first to FIGS. 1 and 2, the utensil of the invention, indicated generally at 1, comprises four main components: a housing 4, a cooking pan 5, a spider 8, and a cover 10. The housing 4 is shaped generally like a saucepan or pot, but has a large opening 16 in its bottom. FIGS. 2, 4 and 5. The housing 4 is preferably equipped with lifting handles 18. There is a vertical slot 6 in its side which extends to the top.

The cooking pan 5, FIG. 2, which is preferably made about like an ordinary frying pan with a handle 7, fits loosely inside the housing 4, and its handle 7 protrudes through the slot 6. Thus, the pan may be inserted or removed by means of its handle 7 without touching the housing 4 or reaching inside it.

Lid or cover 10 has a re-entrant or concave top, FIGS. 1, 2, 4 and 5. It is provided with a central lifting handle or knob 11. Preferably, the cover 10 is also provided with a vent opening at 12. This vent may be opened or closed by moving a generally flat vane 13, shown best in FIG. 3. The vane 13 may be moved rotatably by turning the knob 11.

In use, the housing 4 is set over one of the burners on the top of a cooking stove or plate of any suitable type. In FIG. 2, a portion of a stove top is indicated at 50 and a conventional gas burner at 51. Cooking pan 5, FIG. 2, is set inside the housing 4 with its handle 7 sticking out through the slot 6.

To support the bottom of a pan such as 5, a heat-distributing "spider" 8 is positioned over the bottom opening 16. This spider is preferably made of cast aluminum or iron or a die-cast alloy about 5 or 6 cm. thick, for good heat conduction. Referring to FIGS. 2 and 4, it preferably has radial downcurved legs 8a, whose tips rest in the trough-like bottom rim portion of housing 4 which surrounds the opening 16. This bottom rim portion is made channel-like, or troughlike, by the upturned inner circumferential lip portion indicated at 16a. The purpose is to retain grease or the like which may spatter out of the pan 5.

The spaces 8b between the legs 8a of spider 8 aid in providing a path for heated air to rise from burner 51 up past the sides of pan 5. There is also an annular air space below the rim portion of the main body of spider 8, due to its being held up by the downward curvature of legs 8a. See FIG. 2.

Spider 8 is preferably also provided with several integral short rounded bosses or protruberances, FIGS. 2 and 4, to space the bottom of pan 5 slightly above the surface of spider 8. They may be about 3 mm. high. This provides a limited air circulation between spider 8 and pan 5, helping to keep the pan bottom clean, but provides even heat distribution by short-range heat radiation from spider to pan.

The top portion of cover 10 being lower in the center than at the edges, FIGS. 2, 5, 6, water vapor and grease from the cooking food tend to condense on the underside and run toward the center, then drip back into the pan 5. This feature keeps the food from drying out and keeps the stove top clean.

Several cooking pans of different sizes may be provided with a single housing and cover. For shipping purposes, a set of, e.g., three such pans, may be nested together inside the housing 4, with their handles temporarily removed. Such a set of pans is shown at 5a, 5b, 5c in FIG. 6.

The handles, as handle 7, may be made of double strips of sheet metal, such as stainless steel, in known manner. The side of each pan may be provided with a pair of threaded studs welded on as at 15, FIG. 6. The handles may then be fastened on over the studs by means of acorn nuts.

A single cover, such as 10, FIG. 6, may serve as shown for housings of smaller diameter or for other utensils, such as a saucepan 5d. The concave shape of the cover serves to hold it centered to a substantial degree, an advantage that is not present with conventional pot lids and covers of flat or convex shape. The action of the re-entrant or concave cover in guiding drippings back into the center of the pan will obtain, obviously, on pots or pans of any size.

The vent 12 in cover 10, FIGS. 1-4, provides for varying the percentage of moisture and grease retained in the food during cooking. For maximum retention, the vent is closed, and vice versa. The sector-shaped vane 13 which controls the opening of the vent 12 is attached at its inner end portion to a shaft or the like attached to the knob 11. Turning this knob controls the opening. The vent is preferably located several centimeters out from the center of cover 10 so that escaping steam will not scald the chef's hand.

A thermometer T of a suitable known type may be inserted into the vent opening 12, as indicated in FIG. 2.

The manner in which the handle 7 protrudes out through the slot 6 provides a safe means to pick up the cooking pan 5 without getting the hand near the housing 4 or the stove burner.

The utensil herein described saves heat energy and cooks food faster and more evenly than conventional means. It is suitable for baking and roasting of the kind usually done in an oven, e.g., baking potatoes or small pastries. Bacon may be fried without turning it over.

The cooking pans, such as 5a-5c, may be used separately as frying pans or saucepans in the conventional way. The cover may be used separately as a pot lid, with the advantages noted above.

The utensil of this invention has been used successfully for baking, frying, or roasting all the common meats, vegetables, cereal products, and combinations thereof. Due to the even distribution of heat and the self-basting action of the cover, beef, fowl, or bacon may be fried with substantially no turning over. The utensil is suitable for baking pastries, casseroles, omelets, pancakes and waffles. Prepared frozen dishes may be thawed, then heated in substantially less time than with conventional utensils.

I claim:

1. A cooking utensil adapted to be placed over a stove burner or the like, comprising:
   a generally cylindrical pot-like housing having an open top, a substantial opening in the bottom having a bottom rim portion, and a generally vertically-extending slit in its side;
   a cooking pan adapted to be placed inside said housing and having a generally radially-extending handle having an inner portion extendable through said slit to the outside;
   a heat-distributing spider having a generally plate-like central portion smaller than said opening and a plurality of generally radially-extending legs having tip portions supportable in said bottom rim portion, and having spaces between said legs adapted to permit the passage of heated air from said burner up into the interior of said housing; and
   a removable cover for said top,
   said pan being removable from said housing by removing said cover and lifting upward on said handle externally of said housing, an inner portion of said handle passing through said slit.

2. A utensil as in claim 1, wherein:
said central portion of said spider is further provided with a plurality of surface protuberances adapted to support said pan spacedly thereabove.

3. A utensil as in claim 2, wherein:
said lower rim portion has an upturned inner edge defining a generally circular trough, and
said legs of said spider are downcurved, their tip portions engaging the bottom of said trough.

4. A utensil as in claim 1, wherein:
said cover has a rim portion and a top portion,
said top portion being shaped generally as a shallow cone with its apex directed inward,
whereby condensed vapors from cooking food run downward and inward toward said apex and drip back into said pan.

5. A utensil as in claim 4, wherein:
said cover is further provided with a vent opening spaced away from its center,
a vane-like element disposed to variably close said vent,
and a central heat-insulating knob having a shaft portion operably connected to said vane,
rotation of said knob controlling the closure of said vent.

6. A utensil as in claim 1, wherein:
said handle is detachable from said pan,
a plurality of pans of different sizes being nestable inside said housing for the purpose of storage and shipping.

* * * * *